US011452270B2

(12) United States Patent
Caselli et al.

(10) Patent No.: US 11,452,270 B2
(45) Date of Patent: Sep. 27, 2022

(54) AUTOMATIC SYSTEM FOR CONTROL AND MANAGEMENT OF HYDROPONIC AND AEROPONIC CULTIVATION

(71) Applicant: WALLFARM SRL, Rome (IT)

(72) Inventors: Giulio Caselli, Rome (IT); Christian Cervone, Rome (IT); Massimiliano Carbone, Rome (IT); Jacopo Teodori, Rome (IT); Ares Ferrigni, S.benedetto del Tronto (IT)

(73) Assignee: WALLFARM SRL, Rome (IT)

( * ) Notice: Subject to any disclaimer, the term of this patent is extended or adjusted under 35 U.S.C. 154(b) by 544 days.

(21) Appl. No.: 16/496,301

(22) PCT Filed: Mar. 21, 2018

(86) PCT No.: PCT/IB2018/051887
§ 371 (c)(1),
(2) Date: Sep. 20, 2019

(87) PCT Pub. No.: WO2018/172947
PCT Pub. Date: Sep. 27, 2018

(65) Prior Publication Data
US 2020/0060107 A1   Feb. 27, 2020

(30) Foreign Application Priority Data
Mar. 22, 2017   (IT) .................. 102017000031730

(51) Int. Cl.
*A01G 31/02*   (2006.01)
*C02F 1/66*   (2006.01)

(52) U.S. Cl.
CPC .............. *A01G 31/02* (2013.01); *C02F 1/66* (2013.01)

(58) Field of Classification Search
CPC .............. A01G 31/02; C02F 2305/14; G01N 33/0098; G05D 11/138
(Continued)

(56) References Cited

U.S. PATENT DOCUMENTS

| 4,149,970 A | 4/1979 | Atkins et al. |
| 5,184,420 A | 2/1993 | Papadopoulos et al. |

(Continued)

FOREIGN PATENT DOCUMENTS

| CN | 202347885 U | 7/2012 |
| CN | 203102033 U | 7/2013 |

(Continued)

OTHER PUBLICATIONS

International Search Report, PCT/IB2018/051887, dated Jul. 23, 2018.

(Continued)

*Primary Examiner* — Joshua D Huson
*Assistant Examiner* — Katherine Anne Kloecker
(74) *Attorney, Agent, or Firm* — Nixon & Vanderhye (57) ABSTRACT

An automatic system for control and management of hydroponic and aeroponic cultivation of plants in a water-based solution contained in a main reservoir includes: a pump connected to the main reservoir; an analysis chamber connected to the pump; a sensor module with sensing probes; an additive module; an injection module; an electronic control board; and a user interface configured to wirelessly communicate with the electronic control board. The sensor module includes a conveyor plane displaceable horizontally by a motor to accurately position the sensing probes and two linear actuators provided with rack and managed, in turn, by two corresponding servo-motors configured to immerse and independently remove the sensing probes, moving them on two axes.

12 Claims, 8 Drawing Sheets

(58) Field of Classification Search
USPC .......................................... 700/284; 47/57.5
See application file for complete search history.

(56) References Cited

U.S. PATENT DOCUMENTS

| | | | |
|---|---|---|---|
| 5,598,663 A | 2/1997 | Kikuchi | |
| 7,807,446 B2* | 10/2010 | MacIsaac | A01G 9/247 |
| | | | 382/110 |
| 9,603,316 B1* | 3/2017 | Mansey | G05B 15/02 |
| 10,750,689 B2 | 8/2020 | Olesen et al. | |
| 2007/0190521 A1 | 8/2007 | MacIsaac et al. | |
| 2009/0025287 A1 | 1/2009 | Lee | |
| 2016/0174477 A1* | 6/2016 | Li | A01G 27/003 |
| | | | 47/48.5 |
| 2016/0345517 A1* | 12/2016 | Cohen | A01G 31/02 |
| 2017/0035008 A1* | 2/2017 | Ellins | A01G 31/02 |

FOREIGN PATENT DOCUMENTS

| | | |
|---|---|---|
| CN | 103 499 984 | 1/2014 |
| CN | 105278565 A | 1/2016 |
| CN | 105424779 A | 3/2016 |
| CN | 105424950 A | 3/2016 |
| GB | 2 099 519 | 12/1982 |

OTHER PUBLICATIONS

Written Opinion, PCT/IB2018/051887, dated Jul. 23, 2018.
Office Action issued in Chinese Patent Application No. 201880019915.3 dated Apr. 22, 2021.

* cited by examiner

AUTOMATIC SYSTEM FOR CONTROL AND MANAGEMENT OF HYDROPONIC AND AEROPONIC CULTIVATION

The present invention relates to an automatic system for control and management of hydroponic and aeroponic cultivation.

In particular, the present invention relates to an automatic system for control and management of hydroponic and aeroponic cultivation, of the type used in hydroponic or aeroponic cultivations for the management of liquids and solutions.

As it is known, in recent years, scientific and technological development in the field of protected horticulture has been oriented towards the development of sustainable techniques including hydroponics and aeroponics, with the support of automation and computerized systems for monitoring the climate and the cultivation transpiration.

However, hydroponic plants have some disadvantages that have limited the use of this technique in commercial light fixtures. Therefore, small-scale cultivation systems for domestic use have been developed recently.

The most widely used water cultivation techniques are the Nutrient Film Technique (NFT), the "floating system" and the aeroponics.

In NFT, a thin film of nutritive solution flows continuously or at intervals through lightly sloping plastic channels in which the root system grows freely. The NFT is a closed loop system; the nutritive solution is pumped into the highest part of the channel and flows by gravity towards the collection tubes.

In the "floating system", the plants are grown on floating supports placed in tanks filled with nutritive solution. The nutritive solution is stagnant or almost static, with a slow recirculation performed through a tank in which it is aerated, controlled, adapted for pH and for EC and finally disinfected.

Aeroponics is another type of cultivation technique in a liquid, in which the plants are cultivated in perforated plastic panels with roots suspended in the air. The roots are sprayed by nebulization with a nutritive solution generally for a few seconds every 5-10 minutes.

The continuous supply of nutrients to the root system and the favorable conditions of growth in sterile substrates place the plant in a privileged environment of growth; the lack of nutritional and water stress has a positive effect on the quantitative-qualitative characteristics of the final product. The nutritive solution used for hydroponic crops contains all the micro-constituents (iron, copper, manganese, zinc, molybdenum and boron) necessary for the development of plants, in concentration of the order of moles and $\mu$ moles per liter.

The modern systems for the control of mineral nutrition in hydroponic systems are based on the maintenance on the feed-back of a concentration of the nutrient in the root zone with a standard nutrient solution. In closed systems, nutrients are continuously fed based on EC measurement and chemical analyzes performed using rapid tests or portable analytical devices.

A known solution is reported in the U.S. Pat. No. 5,598,663, which describes a hydroponic nutrient solution control system capable of performing the nutrient solution control automatically, accurately, effectively, and efficiently. In the system, the supplies of the acid nutrient ion ingredient solutions and the alkali nutrient ion ingredient solutions from the acid solution tanks and the alkali solution tanks to the nutrient solution tank are controlled according to the pH measured by the pH meter and the ion concentrations measured by the ion analyzer. The system may also control the supplies of the high concentration nutrient solutions and the water from the high concentration nutrient solution tanks and the water supply according to the electrolytic conductivity measured by the electrolytic conductivity meter.

Another solution, reported in the U.S. Pat. No. 4,149,970, relates to a method for operating a nutrient film plant growth technique so as to minimize the build up of one chemical in the circulating solution without a corresponding build-up of other chemicals, notably nutrient chemicals, therein. For example, the feed of nutrient chemicals is in proportion to the feed of water to the solution, or the concentration of non-nutrients is maintained at a low level or discounted when assessing the amount of nutrient to add to the solution to maintain the desired nutrient level.

A further solution is described in the patent CN103499984 and provides a nutrient solution ion concentration control method and a nutrient solution ion concentration control system. The system comprises a detecting pool, a control platform, an ion concentration regulating and control device, a sensor array device and a first peristaltic pump, wherein the control platform is used for controlling the first peristaltic pump to pump nutrient solution into the detecting pool from a nutrient solution tank, the detecting pool is used for storing the nutrient solution pumped form the nutrient solution tank, the control platform is also used for controlling the starting detection of the sensor array device, the sensor array device is used for detecting the concentration of at least one ion in the nutrient solution stored in the detecting pool, and transmitting detection results to the control platform, the control platform is also used for receiving the detection results transmitted from the sensor array device and sending ion concentration regulation instructions to the ion concentration regulating and control device according to the detection results, and the ion concentration regulating and control device is used for receiving the ion concentration regulation instructions sent by the control platform, and regulating the concentration of at least one ion in the nutrient solution tank according to the ion concentration regulation instructions. The concentration of ions in the nutrient solution can be precisely controlled.

However, although these known systems have contributed to the optimization of the hydroponic cultivation of plants, they present the limit to cause waste of water and nutrients in addition to the risk of creating an imbalance between the development of the reproductive and vegetative part and therefore prejudice the quality of the product. In particular, the analysis of water with nutrients, need some equipment for measuring and reading the PH and EC. The probes to do that can be very expensive.

Purpose of the present invention is to provide an automatic system for control and management of hydroponic and aeroponic cultivation that guarantees an automatic and optimized management of the liquids and of the nutrient solutions, especially for domestic use and at low cost.

In addition, object of the present invention is to provide an automatic system for control and management of hydroponic and aeroponic cultivation that allows the user to schedule and start the task remotely.

According to the present invention, an automatic system for control and management of hydroponic and aeroponic cultivation is provided, as defined in claim 1.

For a better understanding of the present invention, a preferred embodiment is now described, purely by way of non-limiting example, with reference to the attached drawings, in which.

Figure 1:
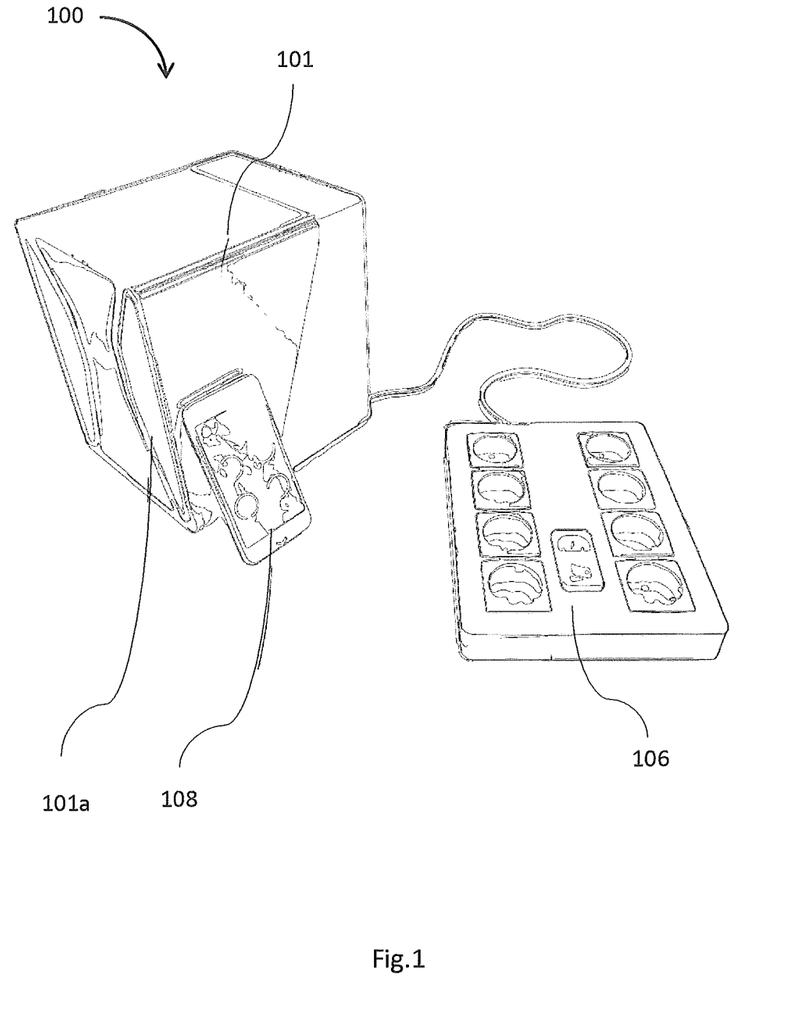
FIG. 1 shows a schematic view of an automatic system for control and management of hydroponic and aeroponic cultivation, according to the invention.
Figure 12:
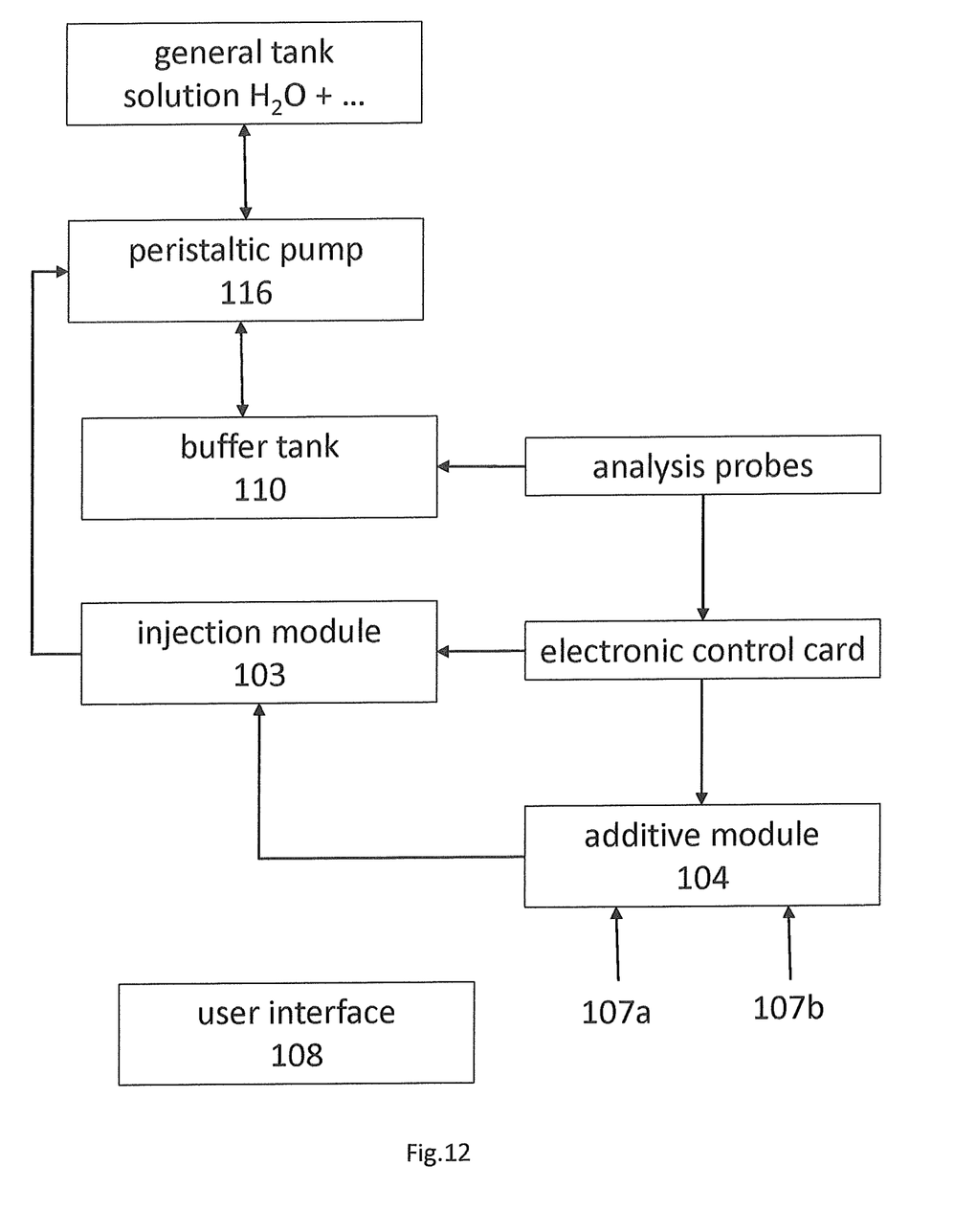
FIG. 12 shows a block diagram of the automatic system for control and management of hydroponic and aeroponic cultivation, according to the invention.

With reference to these figures, and in particular to FIGS. 1 and 12, an automatic system for control and management of hydroponic and aeroponic cultivation is shown, according to the invention.

More in detail, the automatic system 100 for control and management of hydroponic and aeroponic cultivation comprises: a sensor module 102, an injection module 103 and an additive module 104, also shown in the following figures and contained within a main shell 101 equipped with a front compartment opening 101a, a module 106 for power management of the sensor module 102, the injection module 103 and the additive module 104; and a user interface 108, such as a downloadable application that runs on a mobile device, such as a smartphone or tablet, or on a fixed device, such as a PC.

Figure 2:
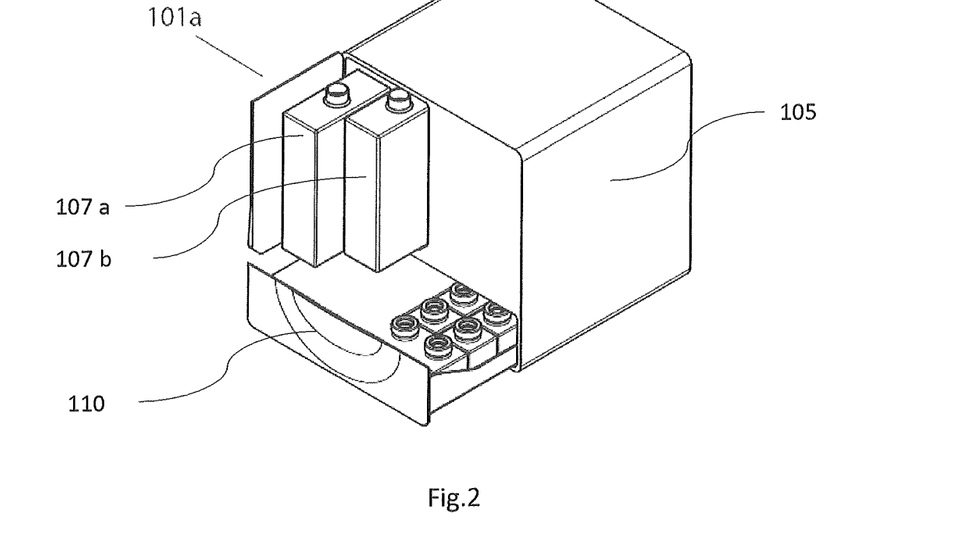
FIG. 2 shows a three-dimensional schematic view of the automatic system for control and management of hydroponic and aeroponic cultivation, according to the invention.
Figure 3:
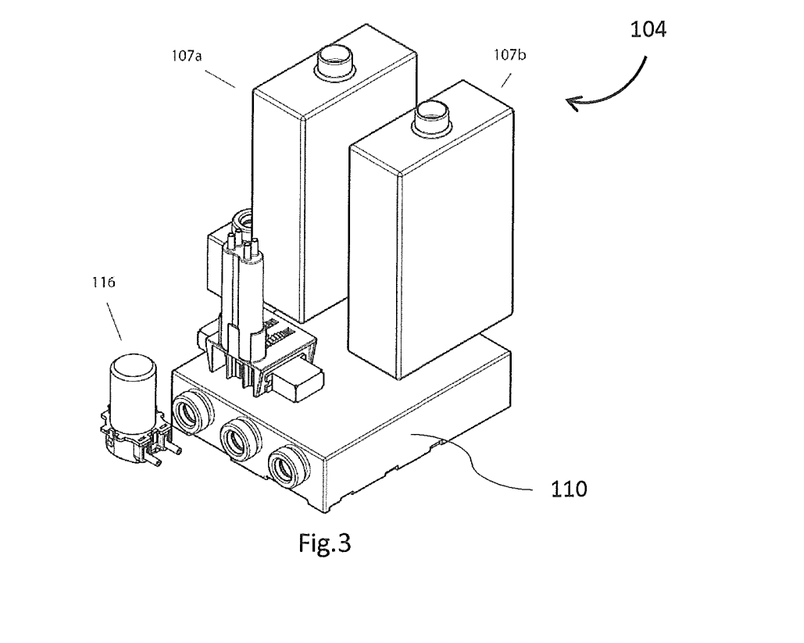
FIG. 3 shows a three-dimensional view of an internal portion of the system of FIG. 2, according to the invention.
Figure 4:
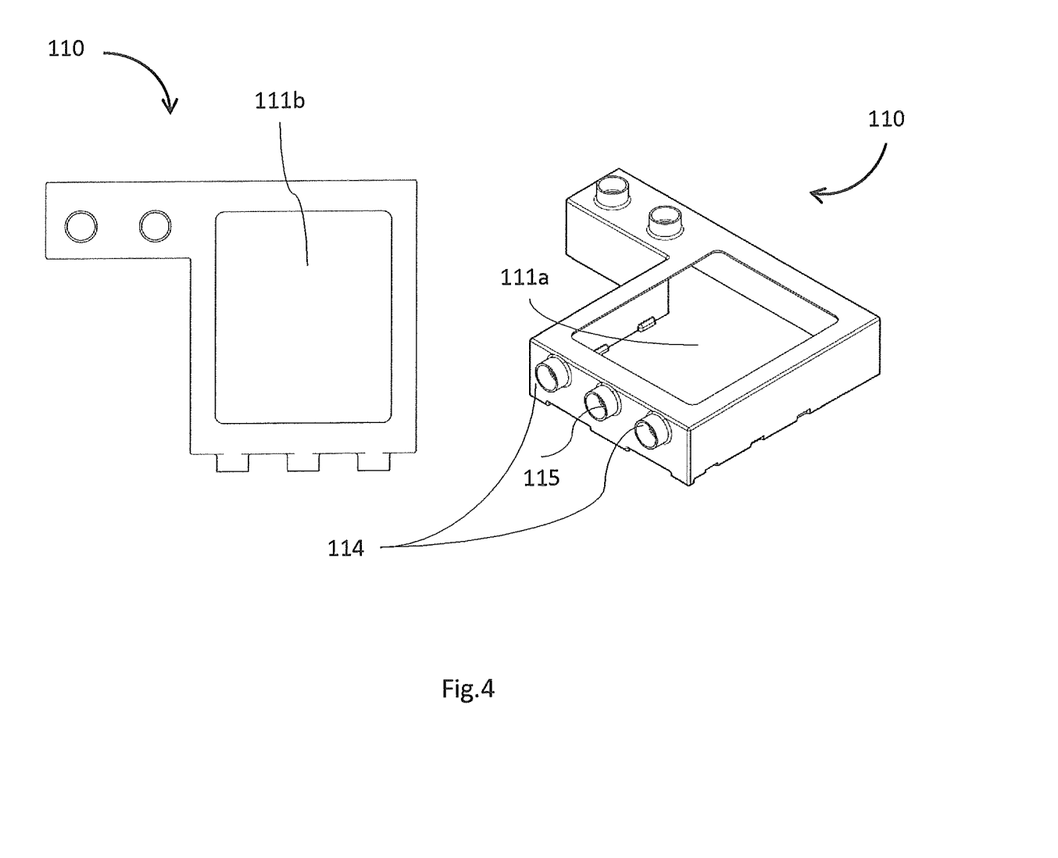
FIG. 4 shows a three-dimensional schematic view of an analysis chamber of the automatic system for control and management of hydroponic and aeroponic cultivation, according to the invention.

The system 100 also comprises an electronic control board, not shown in the figure, comprising a microcontroller, for example of the Atmel type, communicating with the sensor module 102, the injection module 103 and the additive module 104 and configured to manage the communication with these modules. Furthermore, the electronic control card is advantageously configured to adjust the operation of external devices, for example sensors, lighting devices, water and air distribution pumps, that are devices powered also by the power management module 106. According to an aspect of the invention, the additive module 104 comprises cartridges or bottles containing two liquids, for example based on nitrogen, phosphorus or potassium and on a liquid correcting the PH, to be added to a water-based solution contained in a general tank and used to feed plants with roots. These liquids must be dissolved in the solution in optimal quantities calculated from the electronic control board on the basis of information supplied by the sensor module 102. In particular, the additive module 104 comprises at least one bottle of nutrients 107a and at least one bottle of PH corrector 107b, shown in FIG. 2 housed in suitable seats inside the body 101. The shell 101 has, in fact, two apertures, not shown in the figure, which allow the entry of the bottles 107a and 107b, in order to enable the charging. The bottom of these openings consists of a mechanical system of semi-permanent drilling and anchoring, which serves to channel the additive liquid inside a hydraulic system present in the system 100, allowing the injection module 103 to suck its contents.

According to an aspect of the invention, each bottle 107a and 107b is equipped with an electromagnetic serial which, by means of the NFC technology, allows recognition by the control unit, indicating any incorrect positioning or alerting the user in case of necessary replacement.

Advantageously according to the invention, to avoid that the liquid could fall within the corresponding bottle from which it comes, the drilling system is provided with a section that acts as a non-return valve thanks to a sphere placed inside it. In particular, between the drilling system and the corresponding bottle there is a snug fit that allows not to disperse liquids once the bottles have been connected and to disconnect them with no losses even if the connected bottle is not completely exhausted.

Figure 6:
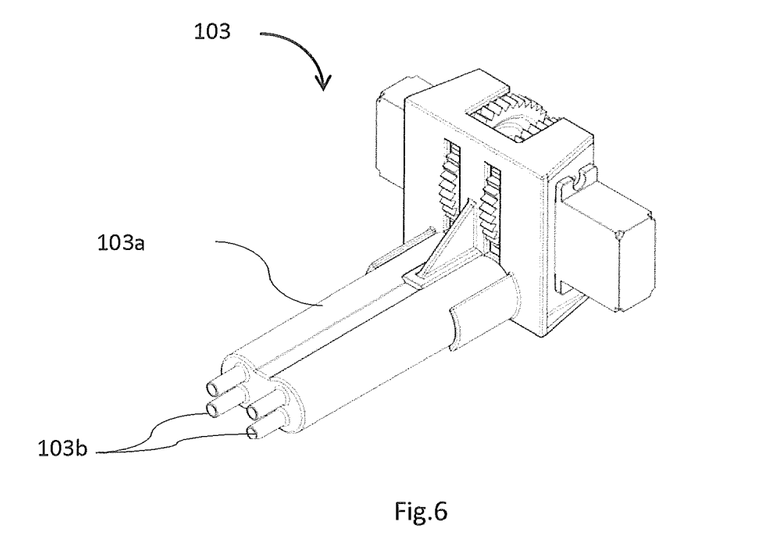
FIG. 6 shows a three-dimensional schematic view of an injection module of the automatic system for control and management of hydroponic and aeroponic cultivation, according to the invention.
Figure 7:
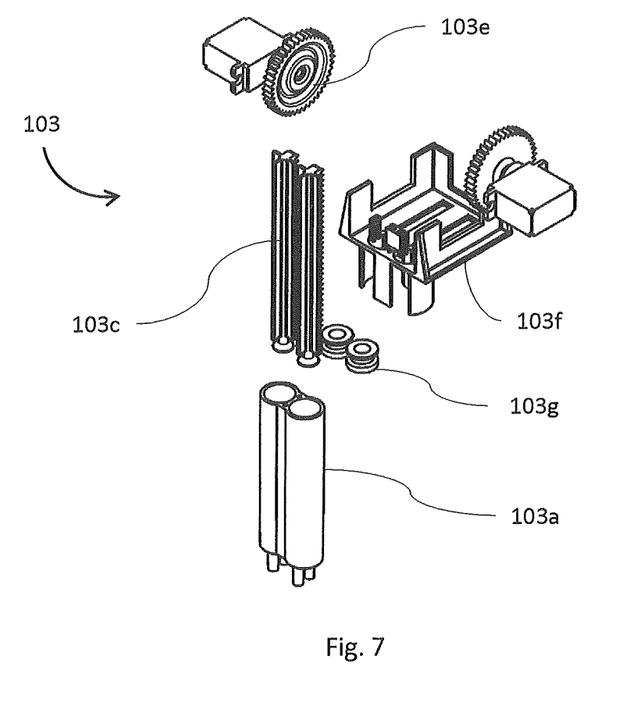
FIG. 7 shows an exploded view of the injection module of FIG. 6, according to the invention.

Advantageously according to the invention, the addition of the liquids coming from the bottles 107a and 107b takes place by means of the injection module 103, as better shown in FIG. 6 and in FIG. 7.

Advantageously, according to the invention, the automatic system allows the self-calibration of the solution.

According to an aspect of the invention, the injection module 103 comprises a loading chamber, or injector 103a provided with a double connector 103b with two valves configured to connect to the hydraulic system, a rubber pad 103g joined to a piston 103c provided with a rack, a motor, for example a servo motor 103d equipped with a gear wheel 103e and a structural frame 103f, or a stepper motor provided with a threaded bar.

Advantageously according to the invention, the electronic board can operate the injection module 103 on the basis of the calculations deriving from the reading of the sensor module values and then deliver the specific additive dosages.

According to one aspect of the invention, each injector 103a corresponds to and operates a single refill bottle 107a or 107b. Therefore, the injection module 103 may comprise a number of injectors 103a corresponding to the number of refill bottles 107a or 107b.

According to an aspect of the invention, a first connector of the injector 103a incorporates a specific valve for inlet of the liquid in the loading phase, and a second connector allows it to escape during the compression phase. Each valve is unidirectional, i.e. it allows the passage of liquid in one direction only.

According to an aspect of the invention, the system 100 further comprises a buffer tank, or analysis and mixing chamber 110 placed below the sensor module 102 to allow the sensors, or probes, to be immersed inside it, and it is connected to a pump 116, preferably a peristaltic pump, better shown in FIG. 5, arranged inside the system 100 and activated by the electronic circuit board of the control based on predetermined communication protocols. The buffer tank 110 is provided with an upper opening 111a, useful for allowing easy cleaning, and a closing plug 111b, preferably closeable by pressure and preferably provided, along its perimeter, with a rubber gasket, to guarantee the watertightness of the tank itself.

According to another aspect of the invention, the buffer tank 110 is provided with two valves identical to those installed on the calibration bottle 102b'' and which are used for the input of the analysis probes of the solution. On the back of the buffer tank 110 are instead placed connectors 114 and 115 respectively of communication with the injectors 103a and the pump 116.

There are a series of registers on the bottom of the tank 110 which advantageously allow its correct positioning on a sliding frame.

According to an aspect of the invention, the refill bottles 107a and 107b have two seats formed in the shell, but instead of sliding outwardly, they are inserted inside suitable seats formed in the body 101, after opening a plastic door hinged to the shell, and manually connected to the connector inside the compartment.

According to an aspect of the invention, the valves to access the watertight buffer 110 are made in high density rubber or silicone, and comprise five elements radially repeated, shaped like an inverted dome, the cavity of which serves as invitation for the entrance of the analysis probe which, pressing from the inside, urges the opening of the segments while maintaining contact over the entire surface, thus preventing the entry of air into the cell below. Once retracted the probe the reunification of the cloves is guaranteed by the elasticity of the material itself. In use, the pump 116 draws a certain amount of solution, such as 1 liter, from the general tank, and fills the buffer tank 110. The analysis probes lowered inside it cannot carry out the analysis according to which the electronic card activates the injectors 103a of the injection module 103 to pour in solution the appropriate quantity of additive liquids. After this procedure, the pump 116 replenishes the entire amount of liquid added to the general tank. According to an aspect of the invention, the refill bottles 107a and 107b are equipped with a special cap provided with a float and a clamping nut that holds the anchor to the connector.

In particular, an electromagnetic NFC device is arranged on the clamping ring nut. The corresponding code reader is positioned in the receiving connector, integral with the machine.

Figure 8:
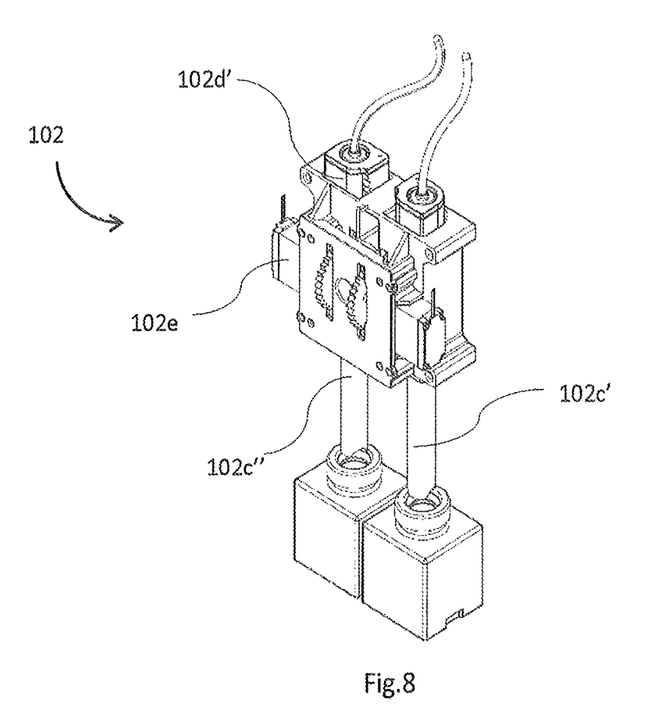
FIG. 8 shows a three-dimensional schematic view of a sensor module of the automatic system for control and management of hydroponic and aeroponic cultivation, according to the invention.
Figure 9:
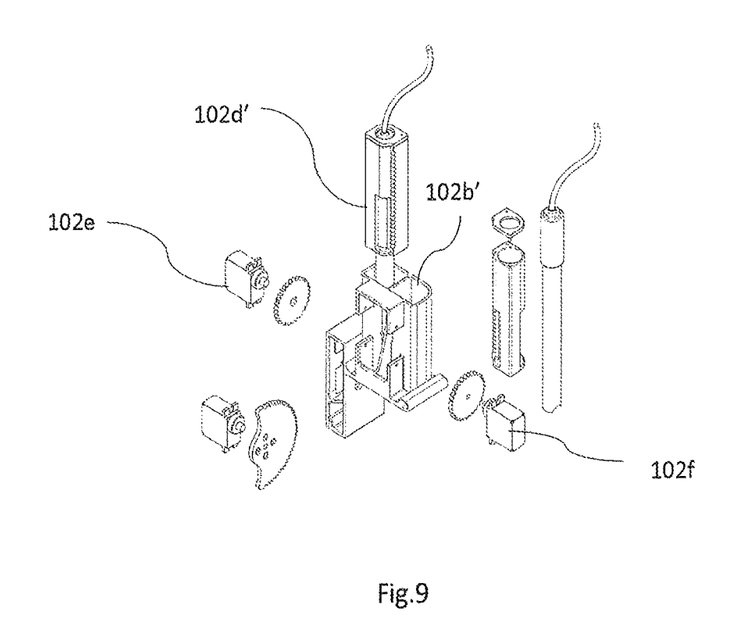
FIG. 9 shows an exploded view of the sensor module of FIG. 8, according to the invention.

FIG. 8 shows the sensor module 102 according to the invention, which comprises a support 102a for moving probes 102c' and 102c'', used in the system 100 for the analysis of liquids or solutions.

According to an aspect of the invention, the sensor module 102 comprises a conveyor plane 102b' which is displaced in the horizontal direction by a stepper motor and is used to accurately position the probes 102c' and 102c''. More in detail, the conveyor plane comprises two linear actuators 102d', 102d'', or probe-holder, equipped with a rack and managed, in turn, by two corresponding servo motors 102e, 102f which allow immersion and extraction of the probes 102c' and 102c'', advantageously, independently of one another.

According to an aspect of the invention, the conveyor plane 102b' is provided with a toothed belt and positioned on the frame by inserting two steel pins into dedicated guides 102g', 102g''.

Advantageously according to the invention, the movement of the probes is developed on two axes.

Figure 10:
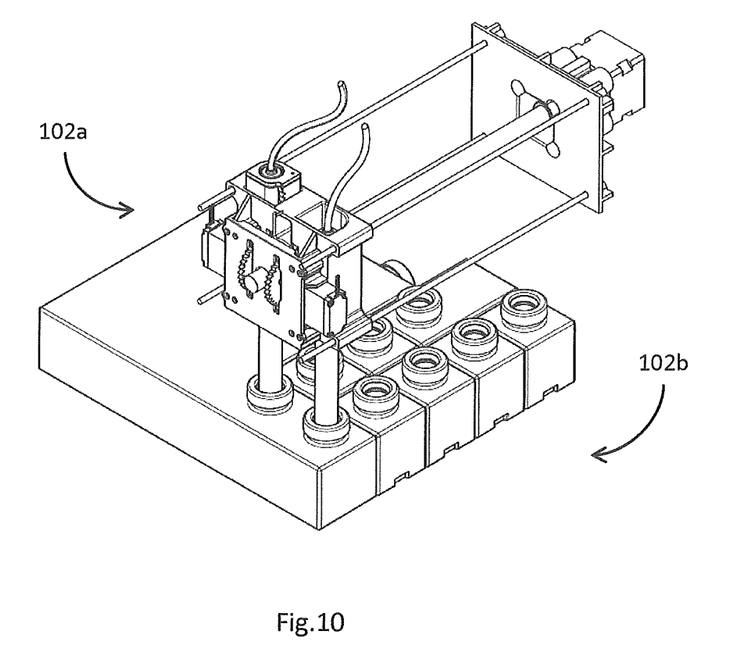
FIG. 10 shows a three-dimensional schematic view of a calibration unit of the automatic system for control and management of hydroponic and aeroponic cultivation, according to the invention.

According to an aspect of the invention, if the probes 102c' and 102c'' require calibration liquids, the sensor module 102 also comprises a calibration support 102b, shown in FIG. 10, and configured to contain the liquids necessary for calibrating the probes 102c' and 102c''.

Figure 11:
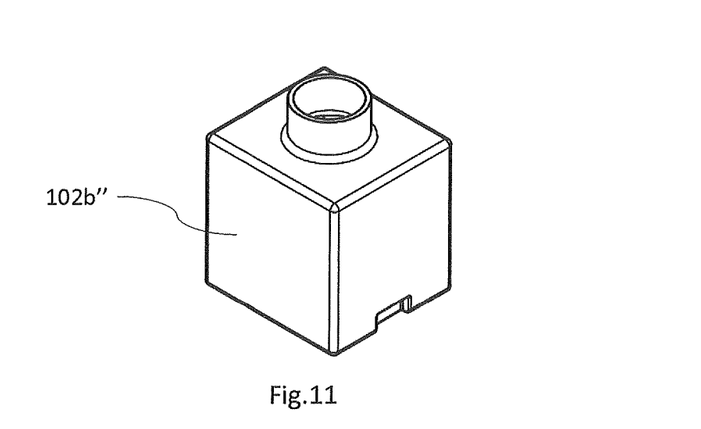
FIG. 11 shows a three-dimensional schematic view of a containment bottle of a calibration liquid of the automatic system for control and management of hydroponic and aeroponic cultivation, according to the invention.

According to an aspect of the invention, the calibration support 102b comprises a set of elements suitable for containing the liquids necessary for the calibration of the probes 102c', 102c'' and capable to protect the liquids from contact with the air. These elements are the special bottles 102b'', shown in FIGS. 10 and 11, provided with watertight check valves which open by means of the mechanical pressure exerted by the probes 102c' and 102c'', only when these are activated.

According to an aspect of the invention, the sliding frame can move exclusively the buffer tank 110 and the calibration bottles 102b''. It is therefore made like a drawer, with an opening facing the front face of the shell 101a, inside which they will be positioned the buffer tank 110 and the calibration bottles 102b''.

According to another aspect of the invention, the buffer tank 110 and the calibration bottles 102b are supported by a sliding frame integral with a front bulkhead of the shell 101, not shown in the figure.

In particular, the bottles 102b'' are in number ranging from 6 to 8 and have a volume of between 40 and 200 ml, and preferably equal to 60 ml, extractable and sealed with a film prepared to be removed before use. The bottles can also be contained in a single removable blister. In particular, according to a preferred embodiment, the system comprises four bottles 102b'' for each probe, arranged in series on two lines. Each line includes two calibration liquids, a resting liquid and a cleaning solution, each placed in a bottle 102b''. Each line corresponds to a probe. So, each probe has the possibility, along its path of movement, to enter, one after the other, in four bottles containing liquids necessary for the calibration and maintenance of the same. Two liquids are used to determine a minimum and a maximum value (fundamental for the calibration of the probe), while the other two perform a rinse and rest function. Rinsing is used to prevent contamination of liquids between bottles since small amounts of liquid can remain attached to the probe during extraction. Since each probe passes from one bottle to another according to a specific sequence, an intermediate cleaning station is essential at each passage.

An immerging position of the probes corresponds to each bottle 102b''.

According to an aspect of the invention, the system 100 comprises a protective casing 105 ("casing") to safeguard the injection module 103, of the buffer tank 110, the electronic control board, of the peristaltic pump of loading/unloading and buffer tank. The protective casing can be made as integral element or integral part of the shell. Advantageously according to the invention, the protective casing 105 prevents access to the sensitive elements of the system 100 even during the opening of the front compartment of the shell 101.

Figure 5:
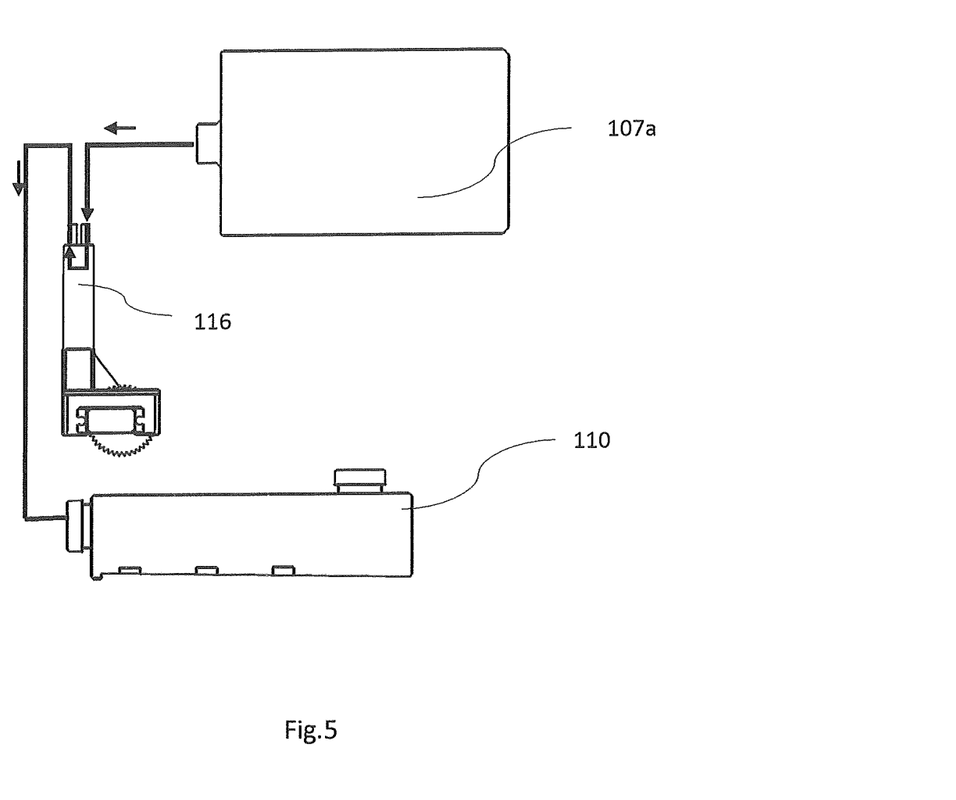
FIG. 5 shows a schematic view of the analysis chamber of FIG. 4 connected to a peristaltic pump and a bottle of nutrients comprised in the automatic system for control and management of hydroponic and aeroponic cultivation, according to the invention.

An operation scheme of the system 100 is shown in FIG. 5.

In use, the management application program installed on the device 108 activates, establishes a connection via wi-fi and records basic references such as date and time. Then, the user can schedule the task via the mobile application, indicating a protocol to be activated, how many liters of solution containing the reservoirs or the system to which the system 100 is connected and which secondary devices are connected. The protocol can signal which peripherals are indispensable for its correct execution and to provide indications of various types. For each protocol correspond and a specific set of additives to be inserted as cartridges/dispensers in the appropriate insertion sites. After the preparation of the system, the user can start the program and according to the specifications provided by the selected protocol, the electronic control card provides to perform the analysis of the solution. Based on the data reading, the program evaluates and determines if it is necessary to intervene by injecting specific dosages of additives that are calculated in relation to the volume in liters of the general tank of the system to which the system 100 is connected. The injection can also take place independently of the analysis to allow programmed dosages, and this makes that, for the entire duration of the protocol, it is not required intervention by the user. During the execution of the programs, activities related to the general maintenance of the system over the medium/long term can also be reported (eg: replacing additive refills, cleaning cycles, replacing calibration fluids, replacing sensors). The pump 116 when activated, draws liquid from the general reservoir of external plant to which the system 100 is connected. The collected "sample" liquid is brought into the buffer tank 110, where it is analyzed by means of the probes 102c' and 102c" and, if necessary, supplemented with additives of the bottles 107a and/or 107b. Once the procedure is complete, the added solution is returned to the general tank of the plant.

The sample of solution taken preferably has a volume of about one liter.

According to an aspect of the invention, the contents of the refill bottle 107a, 107b during use, is monitored by the electronic control board thanks to the NFC sensors, allowing to inform the user, even remotely, on the status of the reloads.

Therefore, the automatic system for control and management of hydroponic and aeroponic cultivation according to the invention guarantees an automatic and optimized management of liquids and nutrient solutions.

Furthermore, the automatic system for control and management of hydroponic and aeroponic cultivation according to the invention allows the user to schedule and start the task remotely.

Furthermore, advantageously, the automatic system for control and management of hydroponic and aeroponic cultivation according to the invention automatically performs and optimizes the dosage of solutions and additives.

It is finally clear that automatic system for control and management of hydroponic and aeroponic cultivation herein described and illustrated, may be subject to modifications and variations without departing from the scope of the present invention, as defined in the appended claims.

The invention claimed is:

1. Automatic system (100) for control and management of hydroponic and aeroponic cultivation of plants, for the management of a water-based solution contained in a general tank, comprising:

A pump (116) connected to the general tank;
An analysis chamber (110) connected to the pump (116);
A sensor module (102) comprising sensing probes (102c', 102c") configured to be immersed into the analysis chamber (110), a handling support (102a) of the sensing probes (102c', 102c") and a calibration support (102b) containing liquids necessary for the calibration of the sensing probes (102c', 102c");

An additive module (104) comprising at least one liquid nutritional bottle (107a) and at least one liquid PH corrector bottle (107b) to add the liquids to the water-based solution;
An injection module (103) comprising at least one injector (103a) for each bottle (107a, 107b) able to channel the liquids of said bottles (107a, 107b) and send them to the analysis chamber (110);
An electronic control board configured to: receive from the sensing probes (102c', 102c") the data of the analysis of the solution sent from the general tank to the analysis chamber (110) by means of the pump (116); driving the addition of the liquids from the bottles (107a, 107b); enabling the injectors (103a) to send a predetermined amount of additive liquids in the analysis chamber (110); and adjusting the operation of further external devices; and
A user interface (108) configured to wireless communicate with the electronic control board; wherein the sensor module (102) comprises a conveyor plane (102b') displaceable horizontally by a motor to accurately position the sensing probes (102c', 102c") and two linear actuators (102d', 102d") provided with rack and managed, in turn, by two corresponding servomotors (102e, 102f) configured to immerse and independently remove the sensing probes (102c', 102c"), moving them on two axes.

2. Automatic system (100) for control and management of hydroponic and aeroponic cultivation of plants according to claim 1, wherein the calibration support (102b) comprises calibration bottles (102b") provided with watertight check valves, able to be opened in response to a mechanical pressure exerted by the sensing probes (102c', 102c") when activated, removable and sealed with a removable film.

3. Automatic system (100) for control and management of hydroponic and aeroponic cultivation of plants according to claim 2, wherein the analysis chamber (110) and the calibration bottles (102b") are supported by a slide frame integral with a front of the shell (101).

4. Automatic system (100) for control and management of hydroponic and aeroponic cultivation of plants according to claim 1, further comprising a shell (101) equipped with a front compartment opening (101a) and openings for the input of the bottles (107a, 107b), and a bottom constituted by a mechanical drilling and anchoring semi-permanent system provided with non-return valve and configured to channel the additive liquid into the injection module (103).

5. Automatic system (100) for control and management of hydroponic and aeroponic cultivation of plants according to claim 4, wherein the analysis chamber (110) and the calibration bottles (102b") are supported by a slide frame integral with a front of the shell (101).

6. Automatic system (100) for control and management of hydroponic and aeroponic cultivation of plants according to claim 1, wherein the analysis chamber (110) and the calibration bottles (102b") are supported by a slide frame integral with a front of the shell (101).

7. Automatic system (100) for control and management of hydroponic and aeroponic cultivation of plants according to claim 6, wherein the analysis chamber (110) is provided with: an upper opening (111a); a watertight closure plug (111b); two valves for the input of sensing probes (102c', 102c"); connectors (114, 115) respectively communicating with the injectors (103a) and with the pump (116); and a register for placement on the sliding frame.

8. Automatic system (100) for control and management of hydroponic and aeroponic cultivation of plants according to claim 1, wherein each bottle (107a, 107b) is equipped with an electromagnetic serial ID recognizable by the electronic control board.

9. Automatic system (100) for control and management of hydroponic and aeroponic cultivation of plants according to claim 8, wherein the bottles (107a, 107b) are equipped with a cap provided with a dip tube and a tightening ring which allows the anchor to the connector (103b) and on which is disposed an NFC electromagnetic device, whose code reader is positioned on the receiving connector (103b).

10. Automatic system (100) for control and management of hydroponic and aeroponic cultivation of plants according to claim 1, wherein the at least one injector (103a) is equipped with two connectors (103b) having two valves, with a rubber pad (103g) jointed to a piston (103c) provided with a rack and a motor, a first connector (103b) incorporating a specific one-way valve for the inlet of the liquid in a loading phase and a second connector (103b) allowing the liquid drainage in a compression phase.

11. Automatic system (100) for control and management of hydroponic and aeroponic cultivation of plants according to claim 1, wherein the bottles (107a, 107b) are equipped with a cap provided with a dip tube and a tightening ring which allows the anchor to the connector (103b) and on which is disposed an NFC electromagnetic device, whose code reader is positioned on the receiving connector (103b).

12. Automatic system (100) for control and management of hydroponic and aeroponic cultivation of plants according to claim 1, wherein the analysis chamber (110) is provided with: an upper opening (111a); a watertight closure plug (111b); two valves for the input of sensing probes (102c', 102c"); connectors (114, 115) respectively communicating with the injectors (103a) and with the pump (116); and a register for placement on the sliding frame.

\* \* \* \* \*